US010287110B1

(12) United States Patent
Sigmon

(10) Patent No.: US 10,287,110 B1
(45) Date of Patent: May 14, 2019

(54) COMPRESSION-LOADED PLASTIC ROTORS

(71) Applicant: James W. Sigmon, Charlotte, NC (US)

(72) Inventor: James W. Sigmon, Charlotte, NC (US)

( * ) Notice: Subject to any disclaimer, the term of this patent is extended or adjusted under 35 U.S.C. 154(b) by 0 days.

(21) Appl. No.: 15/831,780

(22) Filed: Dec. 5, 2017

Related U.S. Application Data

(60) Provisional application No. 62/429,987, filed on Dec. 5, 2016.

(51) Int. Cl.
  *B65G 53/46* (2006.01)
  *G01F 11/24* (2006.01)
  *F16K 3/26* (2006.01)
(52) U.S. Cl.
  CPC .......... *B65G 53/4666* (2013.01); *G01F 11/24* (2013.01); *F16K 3/26* (2013.01)
(58) Field of Classification Search
  CPC ........ B65G 53/4666; G01F 11/24; F16K 3/26
  See application file for complete search history.

(56) References Cited

U.S. PATENT DOCUMENTS

| | | | | |
|---|---|---|---|---|
| 3,582,040 A * | 6/1971 | Gutierrez | ................... | F16K 3/18 251/182 |
| 4,332,370 A * | 6/1982 | Williams | .............. | F16K 5/0285 137/72 |
| 4,467,701 A * | 8/1984 | Sigmon | ................... | F16D 65/14 277/345 |
| 4,510,966 A * | 4/1985 | Parsons, Jr. | ............. | F16K 5/166 137/375 |
| 4,511,120 A * | 4/1985 | Conley | ................. | F16K 27/065 251/288 |
| 4,548,385 A * | 10/1985 | Barbuto | ............. | F16K 11/0853 251/175 |
| 5,029,517 A * | 7/1991 | Sigmon | .............. | B65G 53/4633 222/444 |
| 5,163,656 A * | 11/1992 | Sigmon | ..................... | F16K 3/26 222/452 |
| 5,284,319 A * | 2/1994 | Baumann | ................... | F16K 7/02 251/214 |
| 5,431,311 A * | 7/1995 | Sigmon | ................... | G01F 11/20 222/368 |
| 5,513,832 A * | 5/1996 | Becker | ................ | F16K 31/0624 137/82 |
| 5,871,397 A * | 2/1999 | Nelson | .................... | G01F 1/663 460/7 |
| 9,377,333 B1 * | 6/2016 | Webb | ...................... | G01F 1/115 |

* cited by examiner

*Primary Examiner* — Nathaniel T Woodward
(74) *Attorney, Agent, or Firm* — Ralph H. Dougherty

(57) ABSTRACT

A rotary airlock valve has a housing having an internal horizontal taper, a mating rotor within the housing, a circular groove in each end of said rotor with a compression O-ring situated therein, a pair of compression plates within the housing, each having a circular projection adapted to contact a compression O-ring in one of the circular grooves, end plates fixed to the housing by shoulder bolts situated in and extending through the end plates, the shoulder bolts being adapted to exert compressive force on the O-rings to balance the rotor within the housing. The rotor is plastic or coated metal, the plastic rotor being utilized for lower temperature applications, i.e, ambient temperature to about 600° F., and the coated metal rotors being utilized for higher temperature (about 600 to 1200° F.) applications. There are no metal to metal moving parts. The invention can be utilized by an airlock, mass measurement feeder, control valve, or on-off valve.

26 Claims, 14 Drawing Sheets

CUT-AWAY VIEW OF AIRLOCKS & VALVES

CUT-AWAY VIEW OF AIRLOCKS & VALVES

AIRLOCKS & VALVES HOUSING

HELICAL ROTOR

8-POCKET AXIAL ROTOR

100% HARD PLASTIC COATED METAL CORE ROTOR

Fig. 10
Fig. 11
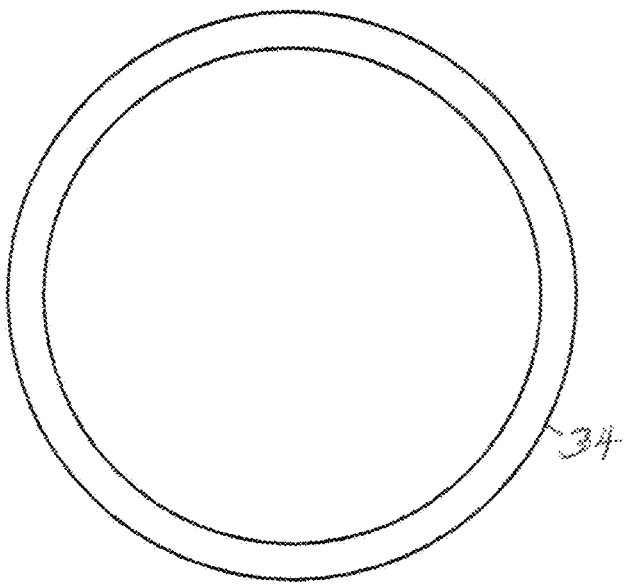
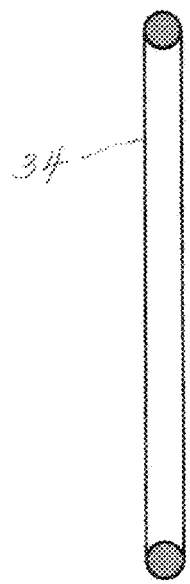
ROTOR COMPRESSION O-RING
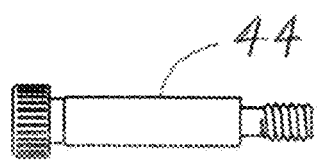
Fig. 23

MOTOR END COMPRESSION PLATE

PLAIN END COMPRESSION PLATE

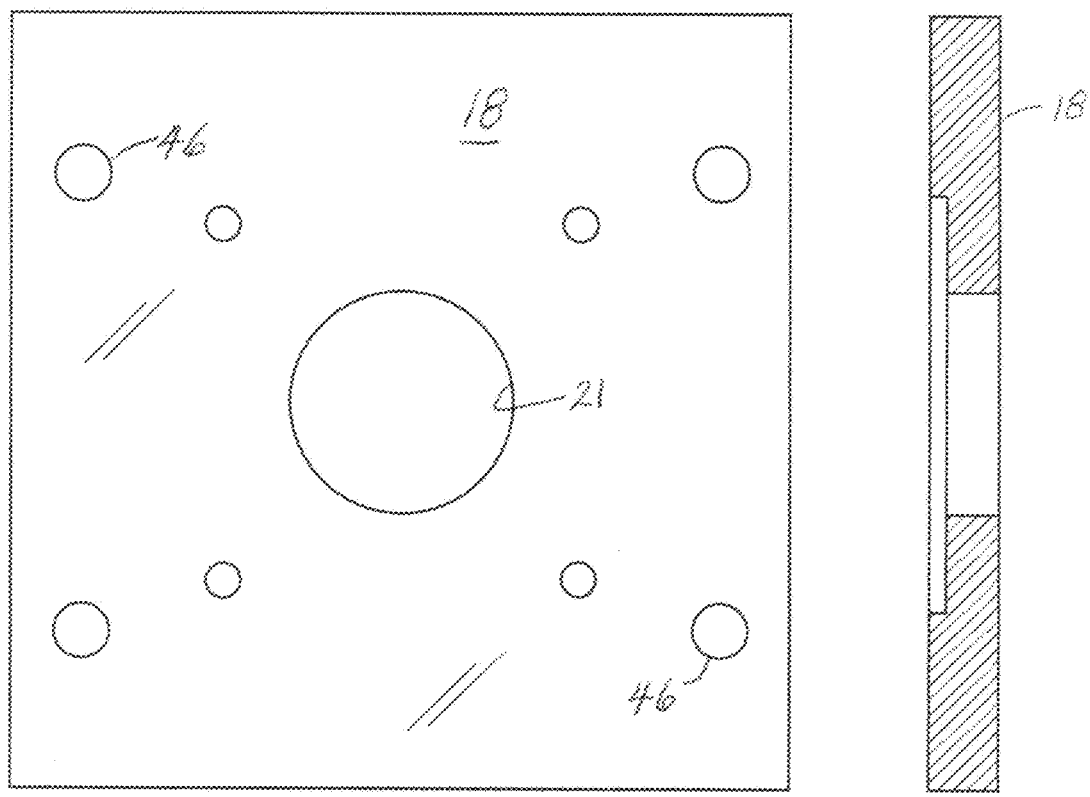
MOTOR END HOUSING END CAP

Fig. 18
Fig. 19
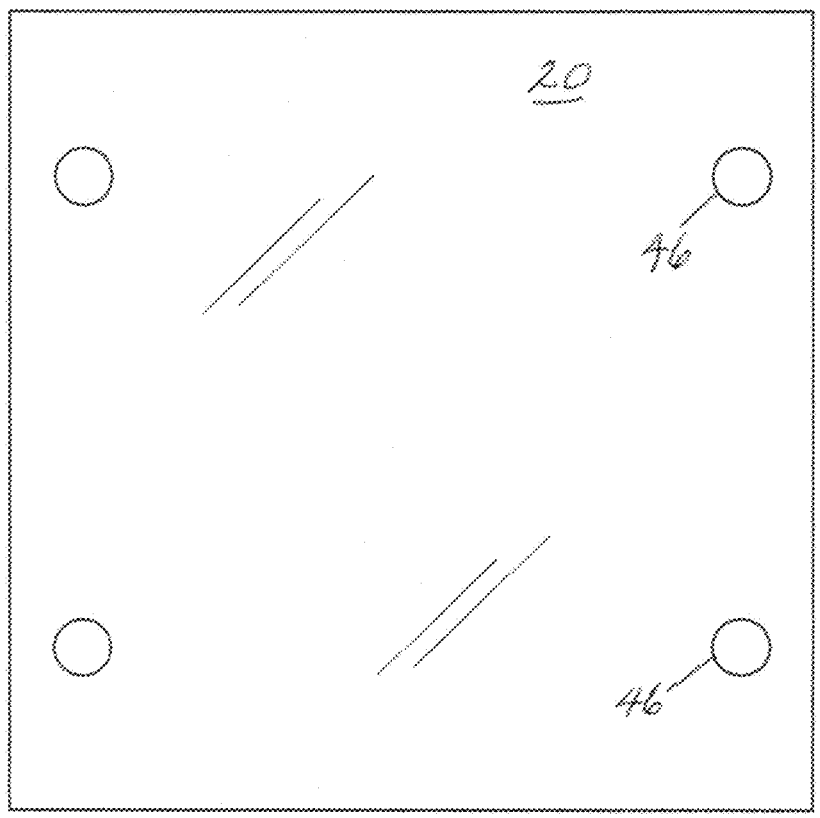
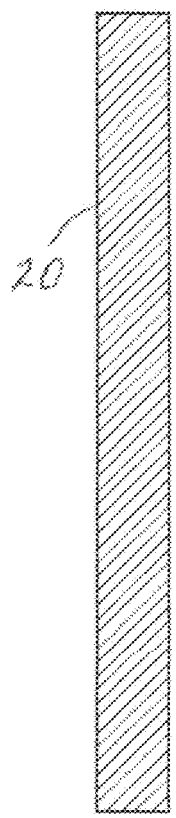
PLAIN END HOUSING END CAP

AIRLOCK VALVE

COMPRESSION-LOADED PLASTIC ROTORS

CROSS REFERENCE TO RELATED APPLICATION

This application claims the benefit of priority of U.S. Provisional Patent Application Ser. No. 62/429,987, filed Dec. 5, 2016.

FIELD OF THE INVENTION

The present invention relates to improved rotors for use in airlocks, mass-measurement feeders, control valves, and on-off valves, particularly compression-loaded rotors which are especially useful in handling of dry solids and particulate materials.

SUMMARY OF THE INVENTION

This invention relates specifically to airlocks and valves with plastic rotors, as well as to airlocks and valves with coated metal rotors. The plastic rotors are utilized for lower temperature applications, i.e, in the range of ambient temperature to about 600° F., and the coated metal rotors are utilized for higher temperature (about 600 to 1200° F.) applications. There are no metal to metal moving parts. The invention comprises: airlocks, mass measurement feeders, control valves, and on-off valves.

The invention handles dry solids material, including at both ambient and high temperatures, and ultra-fine powders under both vacuum and pressure conditions. More particularly, it relates to sanitary rotary airlocks and rotary valves having zero-static leakage and means for venting dynamic leakage therefrom.

Sanitary design construction requirements are incorporated within these airlocks and valves. There are two (2) embodiments with three internal parts, the rotor and two compression rings, and one (1) embodiment with only one (1) internal part, the rotor. In locations where access to the airlocks or valves for cleaning or repair is difficult, this invention is optimal.

The invention includes two (2) airlocks and two (2) valves; an airlock with straight or axial pockets for normal material solids transfer and an airlock feeder with pockets at a 15 degree angle for precise feeding of dry solids material. The two valves are a control valve and an on-off valve. The airlocks and valves are constructed with hard plastic rotors and/or with coated metal rotors. There are no metal to metal moving parts.

The airlocks and valves have a sloped internal housing and a sloped external rotor surface. The slopes of the housing and rotor are generally small, a 6" size rotor is about 6" diameter on its larger end and 5.750" on its smaller end. This is about a 2 degree slope, but the taper can be from about 1 to about 10 degrees. The internal bore of the housing matches this slope. It can be seen that, with a light pressure from the larger end to smaller end of the rotor, there is no static leakage. The invention includes a two-way compressive force or push, otherwise the plastic rotor or the coated metal rotor would stick in the housing. The compressive force on the larger rotor end is slightly greater than the opposing force from the smaller rotor end. This two way push keeps the rotor in a near balanced position. This near balanced rotor provides zero static leakage with low torque operation. Traditionally sloped (tapered) valves must have 12-14 degree tapers to prevent rotor sticking and lock-ups.

In this invention, the slope of the rotor matches the inside (internal) slope of the housing. An approximate 20% diametrical difference exists between the larger rotor end and the smaller rotor end. The all plastic rotor or the coated metal rotor precludes metal to metal contact. Additionally, a light controllable push is applied to the installed rotor. This results from the installed compression rings on each end of the rotor as integral components of the invention.

Two (2) compression rings are installed as an integral part of each rotor. The compression ring installed on the larger end of the rotor is installed in a circular cavity near the OD of the rotor. The compression ring installed on the smaller end of the rotor is installed in a circular cavity near the OD of the rotor. This provides about a 20% diametrical push toward the smaller end of the rotor.

For most applications this differential pressure provides enough push from the larger rotor end to provide perfectly tight sealing, yet precludes rotor sticking within the housing and minimizes rotor to housing wear. Also, the operating torque is low. For the valves and for special airlock applications this pressure differential can be increased if required. It's a matter of increasing the length of the compression ring on the motor end of the compression plate. This increases compression on the smaller end compression O-ring. The 20% pressure differential is suitable for most anticipated applications. However this can be adjusted depending on application pressure.

In addition to static-free leakage operation, the invention's overall construction is such that it lends itself to sanitary requirements, including, but not limited to ease of cleaning. The sanitary requirements are as follows; the airlock or valve housing is bolted in place on the process line. The rotor, compression plate, compression rings and end caps are easily removable. There are no other internal parts. With removal of the larger end cap, compression plate, the rotor and compression rings easily slide out of the housing. They easily can be cleaned and reinstalled into the housing. The end cap is replaced and the airlock or valve is ready to run again—usually with only about a twenty minute lapse of time. The airlocks or valves are constructed of FDA and USDA compliant materials that withstand harsh chemicals and abrasives. This also meets all sanitary requirements.

High-temp applications may reach the 1200-1400 degrees Fahrenheit range. These rotors are metallic and made with surfaces for coating. Below is a non-inclusive list of hard plastics and other non-metals suitable for rotor construction and rotor coatings: For plastic rotors:
DELRIN® acetal homopolymers, produced by DuPont
polyether ether ketone (PEEK)
polyimide
ultra high molecular weight polyethylene (UHMW-PE)
For coated metal rotors:
ceramic
silicone resin #1-6-9096 (1200 Degrees F.)
silicone resin #1-6-9085 (1400 Degrees F.)

OBJECTS OF THE INVENTION

The principal object of the present invention is to provide an improved airlock rotor and rotor housing which will provide zero static leakage.

Another object of the invention is to provide an improved airlock rotor which is easily centered and balanced.

Another object of the invention is to provide an improved airlock valve having hard plastic rotors.

Another object of the invention is to provide an improved airlock valve which is operable over a large range of temperatures.

BRIEF DESCRIPTION OF THE DRAWINGS

The foregoing and other objects will become more readily apparent by referring to the following detailed description and the appended drawings, in which.

FIG. 10 is a front view of a compression O-ring for use in each end of a rotor.

FIG. 11 is a vertical cross sectional view of the O-ring of FIG. 10.

FIG. 16 is the face view of a housing end cap from the motor end.

FIG. 17 is a vertical cross sectional view of the housing end cap of FIG. 16.

FIG. 18 is the face view of a housing end cap remote from the motor end.

FIG. 19 is a vertical cross sectional view of the housing end cap of FIG. 18.

FIG. 23 is a side view of a shoulder bolt for the end plates.

DETAILED DESCRIPTION

Figure 1:
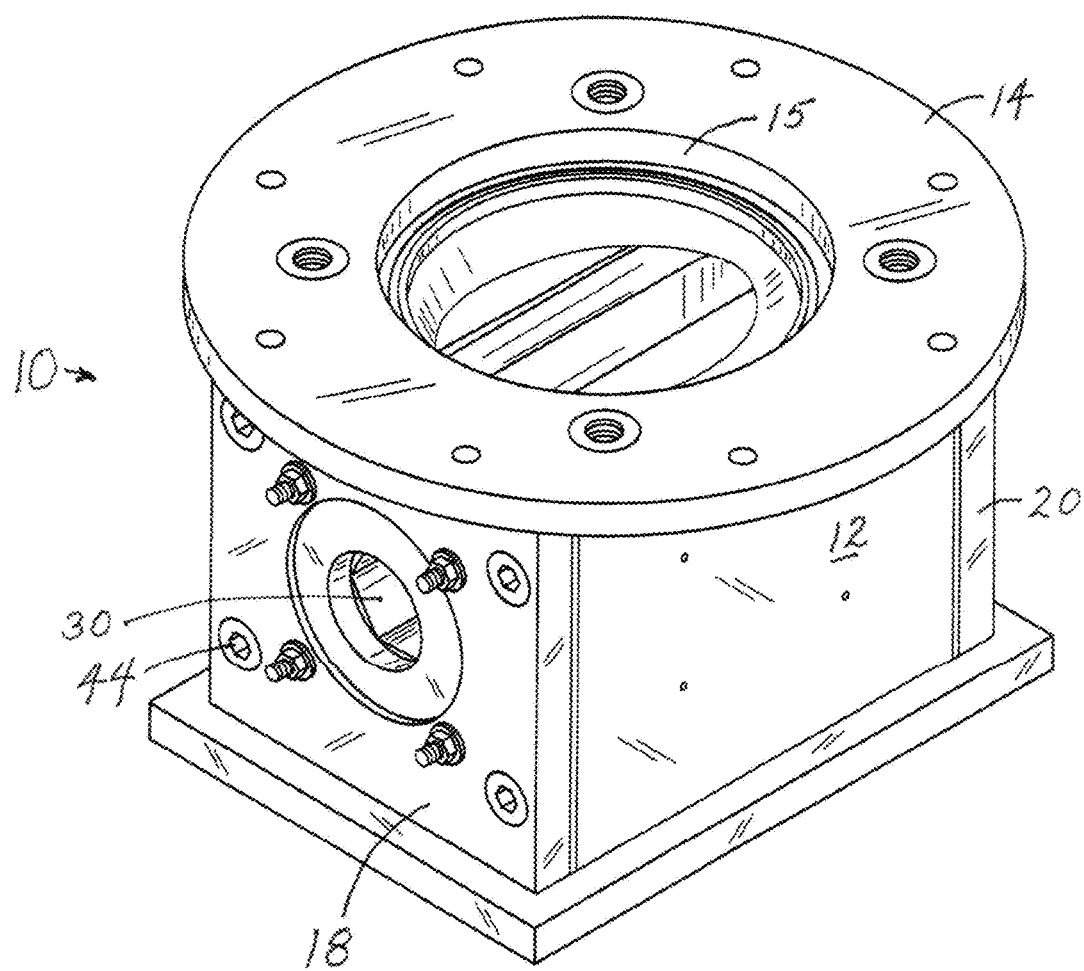
FIG. 1 is an isometric view of the assembled rotary airlock valve of the invention.

Referring now to the drawings, the invented rotary airlock valve 10 consists of a housing 12 having a small internal horizontal taper T, usually less than 4 degrees, for receiving a rotor 26. The housing has a top or inlet flange 14 having an inlet opening 15, and a bottom or discharge flange 16 having an outlet opening 17. End caps 18 and 20 enclose the ends of the housing, end cap 18 having central access 21 for a motor drive. A rotor 26 is rotatably disposed within the housing and is externally tapered to mate with the internal taper of the housing. The rotor may be provided with pockets 28, and has a gear motor drive connector such as socket 30. A circular recess or groove 32 is provided in each end of the rotor 26, and a compression O-ring 34 is situated in each of the circular grooves 32. A drive end compression plate 36 is provided with a central opening 37 to accommodate a drive shaft (not shown) and a circular projection or bearing ring 38 adapted to contact compression O-ring 34 in one of the circular grooves 32. An opposed end compression plate 40 is provided at the end opposing the drive end, and also is provided with a circular projection or bearing ring 42 adapted to contact compression O-ring 34 in the other one of the circular grooves 32. The end plates 18 and 20 are fixed to the housing 12. Shoulder bolts 44 are situated in and extend through holes 46 in the end plates and through holes 48 in the compression plates 36 and 40 into threaded holes 50 in the housing 12. The shoulder bolts exert compressive force through the end plates 18 and 20 and the compression plates 36 and 40 to the compression on the O-rings 34 to center and balance the rotor 26 within the housing 12.

The compression plates 36 and 40 may be constructed of either hard plastic or metal.

Figure 2:
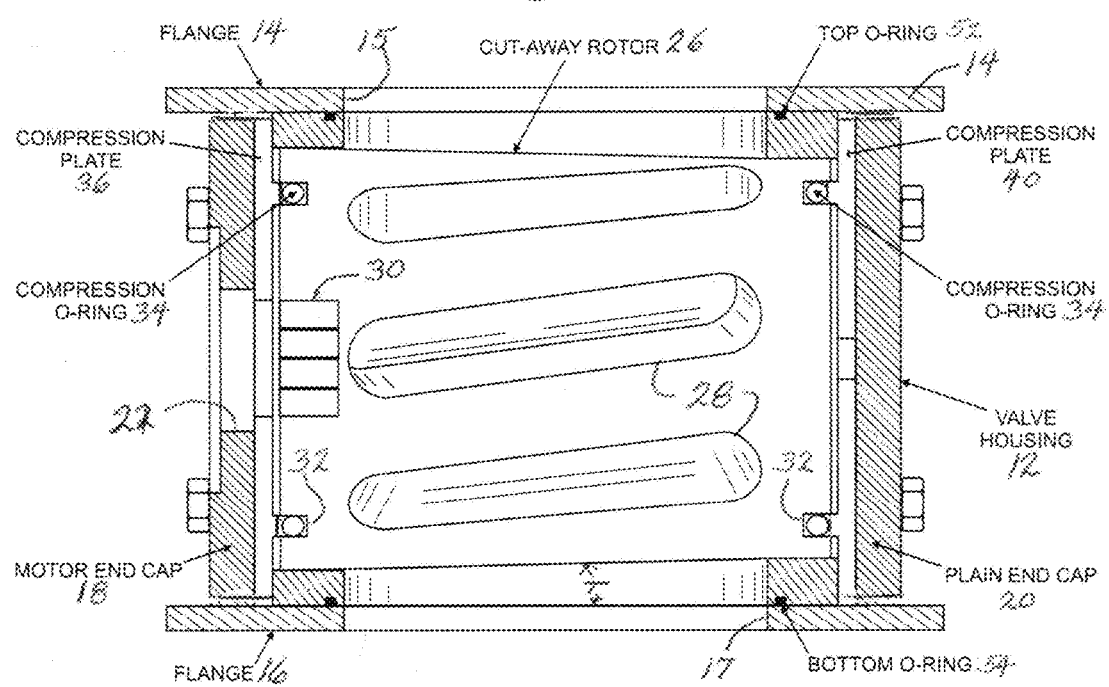
FIG. 2 is an vertical sectional view taken through the axis of the valve of FIG. 1.
Figure 3:
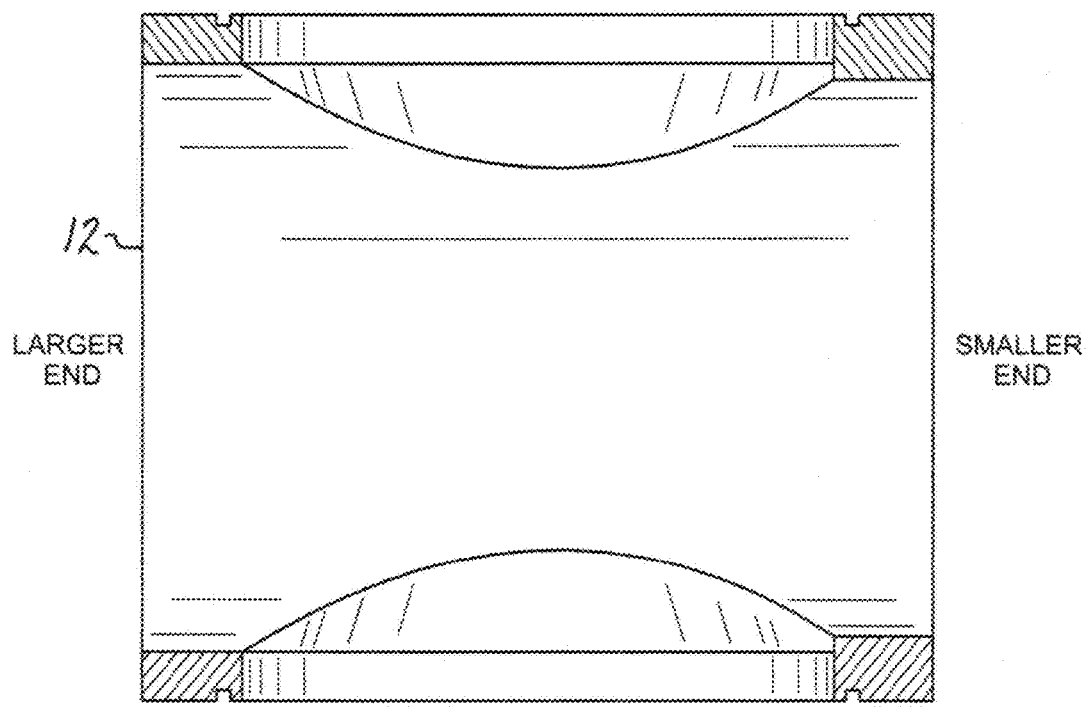
FIG. 3 is a vertical cross-sectional view of an airlock and valve housing.

The housing 12 is advantageously provided with top and bottom standard pressure-seal O-rings 52 and 54 as shown in FIG. 2. O-ring 52 is positioned s between the top flange 14 and the housing, preferably in an o-ring groove in the top of the valve housing. O-ring 54 is positioned between the bottom flange 16 and the housing, preferably in an o-ring groove in the bottom of the valve housing. These pressure seal O-rings prevent static and dynamic leakage from the interior of the housing.

As stated above, the housing 12 incorporates a slight internal taper, the larger or drive end being show on the left and the smaller end on the right in the Figures. All four rotors of this invention fit this taper when centered. The rotors are balanced in this position. The housing is preferably cast of aluminum or stainless steel.

Figure 4:
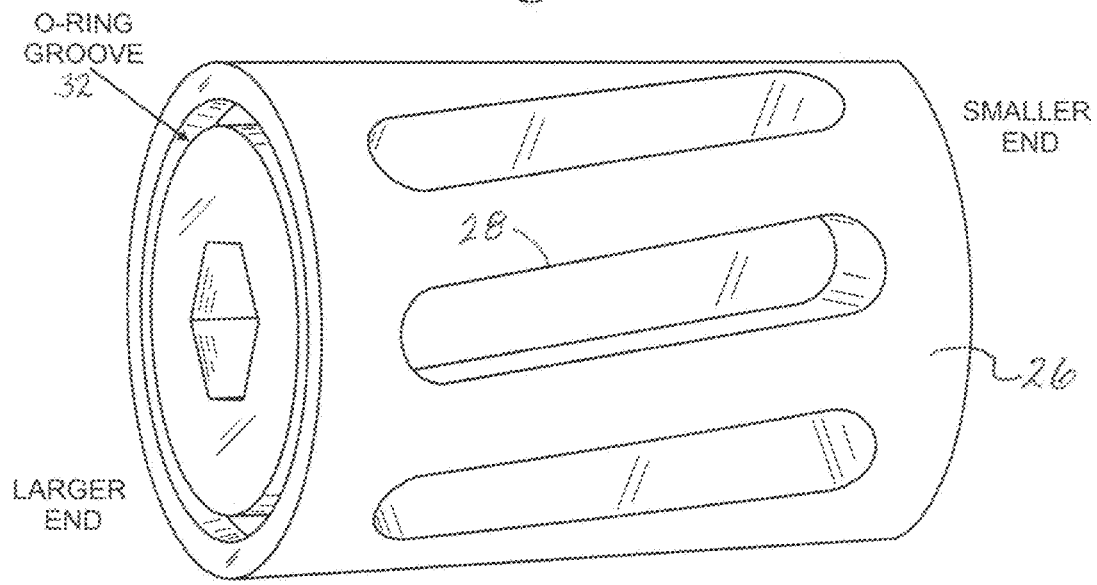
FIG. 4 is an isometric view of a helical rotor, which is adapted to fit into the housing of FIG. 3.
Figure 5:
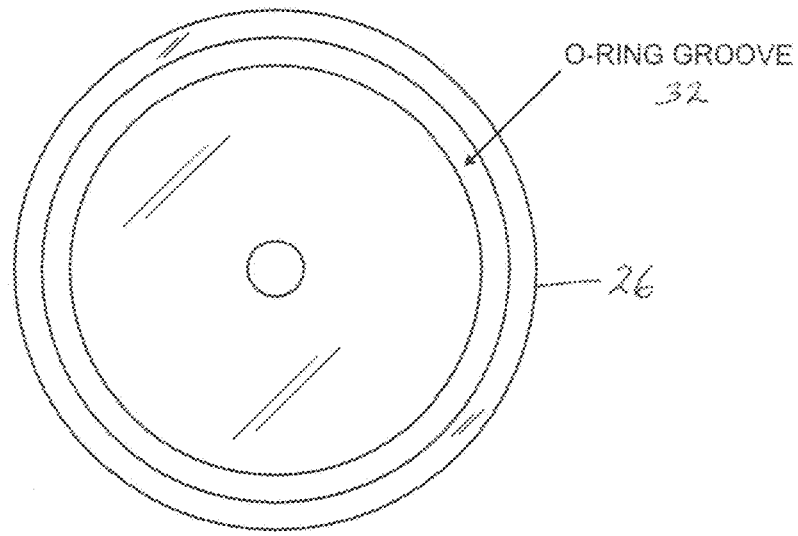
FIG. 5 is a right hand end view of any of the rotors of the invention.

The helical rotor (i.e., having helical pockets) of FIG. 4 is shown with 6 pockets, but it can be made with from 1 to 12 pockets, or more, depending on the application. O-ring grooves are provided in each end of the rotor. The O-rings center and balance the airlock within the housing. The rotor is made of 100% hard plastic, or with a plastic-coated metal core.

Figure 6:
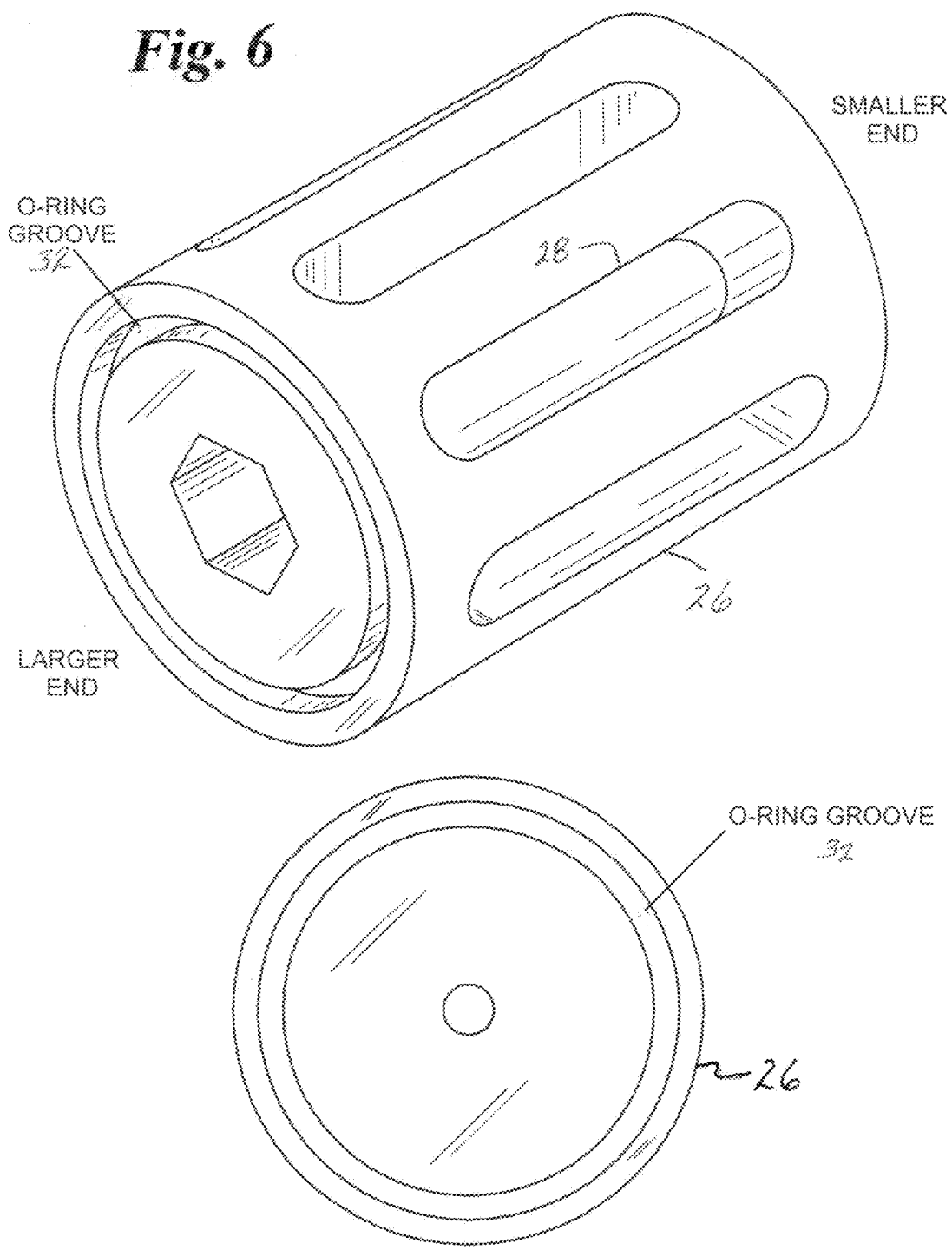
FIG. 6 is an isometric view of an 8-pocket axial rotor, which is adapted to fit into the housing of FIG. 3.

The axial rotor of FIG. 6 is shown with eight pockets, but it can have from 2 to any higher desired number of pockets. This rotor, with straight pockets, is useful on microwave mass measurement applications. The rotor is made of hard plastic or a plastic-coated metal core.

Figure 7:
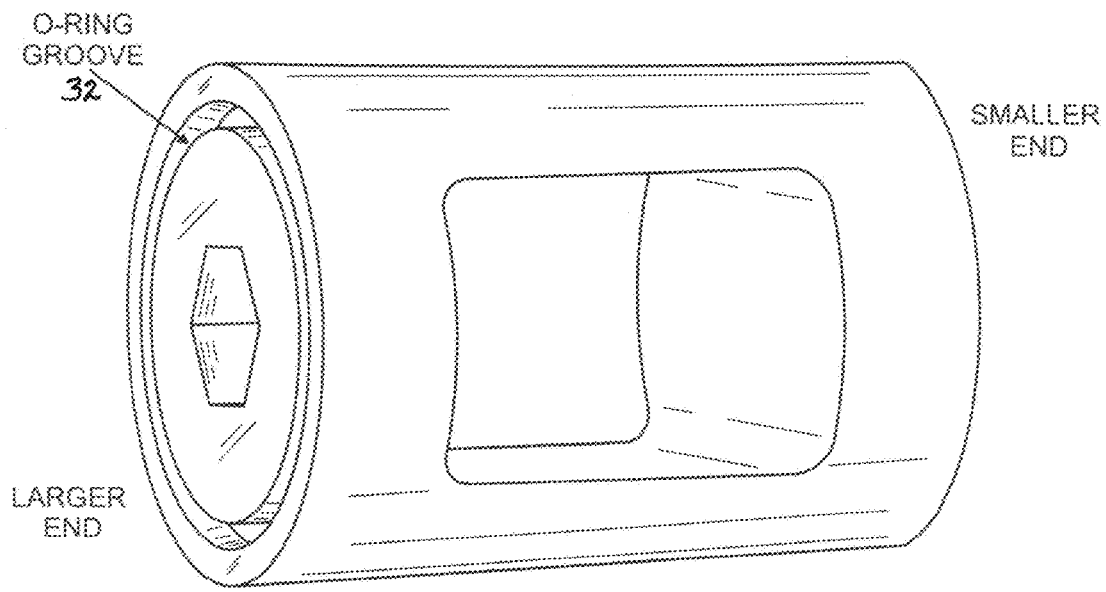
FIG. 7 is an isometric view of a flow control rotor, which is adapted to fit into the housing of FIG. 3.

The rotor of FIG. 7 is an on-off control. It rotates only 90 degrees, from an off or fully closed position to an on or fully open position.

Figure 8:
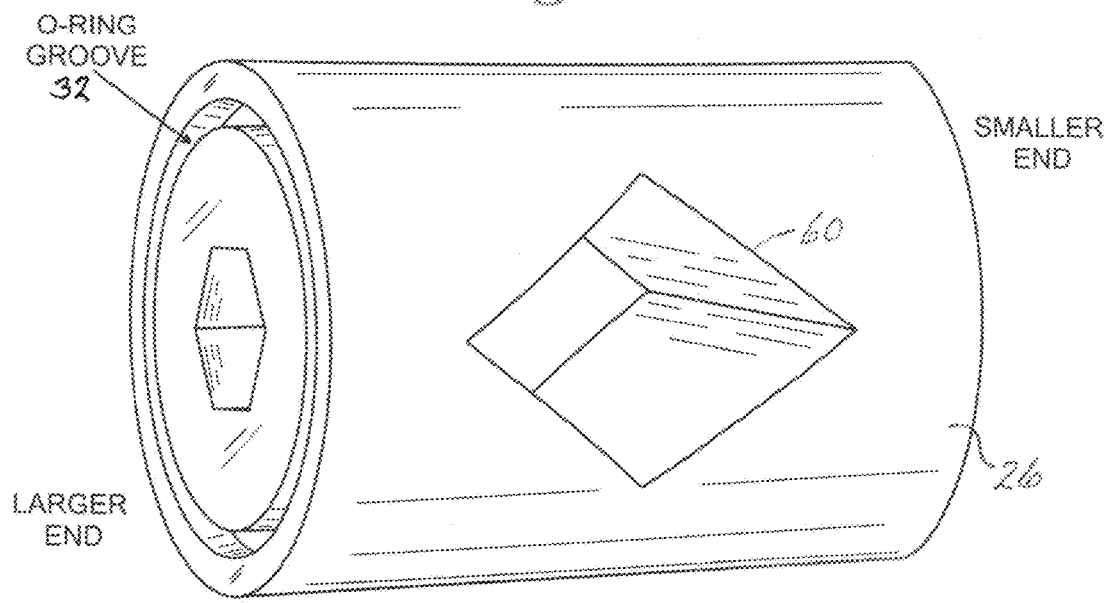
FIG. 8 is an isometric view of an on-off control rotor, which is adapted to fit into the housing of FIG. 3.
Figure 22:
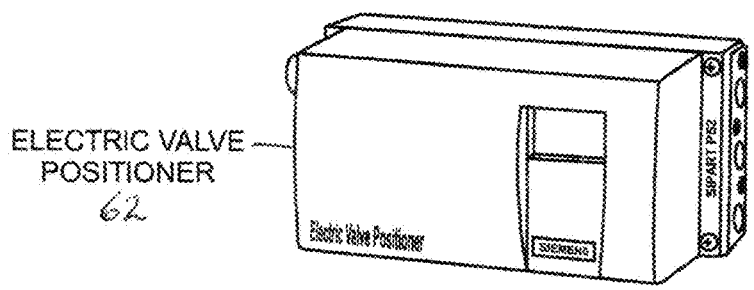
FIG. 22 is an isometric view of an electric valve positioner for a flow control valve according to the invention.

The flow control rotor of FIG. 8 is seated within the housing, and the opening 60 in the rotor is controlled by a positioner 62 (FIG. 22), which may be electric, electronic, or pneumatic. The rotor is made of hard plastic or a plastic-coated metal core.

The rotors may be made of a hard plastic, which is preferably selected from the group: Ultra high molecular weight (UHMW) polyethylene; PEEK (polyetheretherketone), polyimide, or DELRIN® acetal homopolymers, produced by DuPont.

Figure 9:
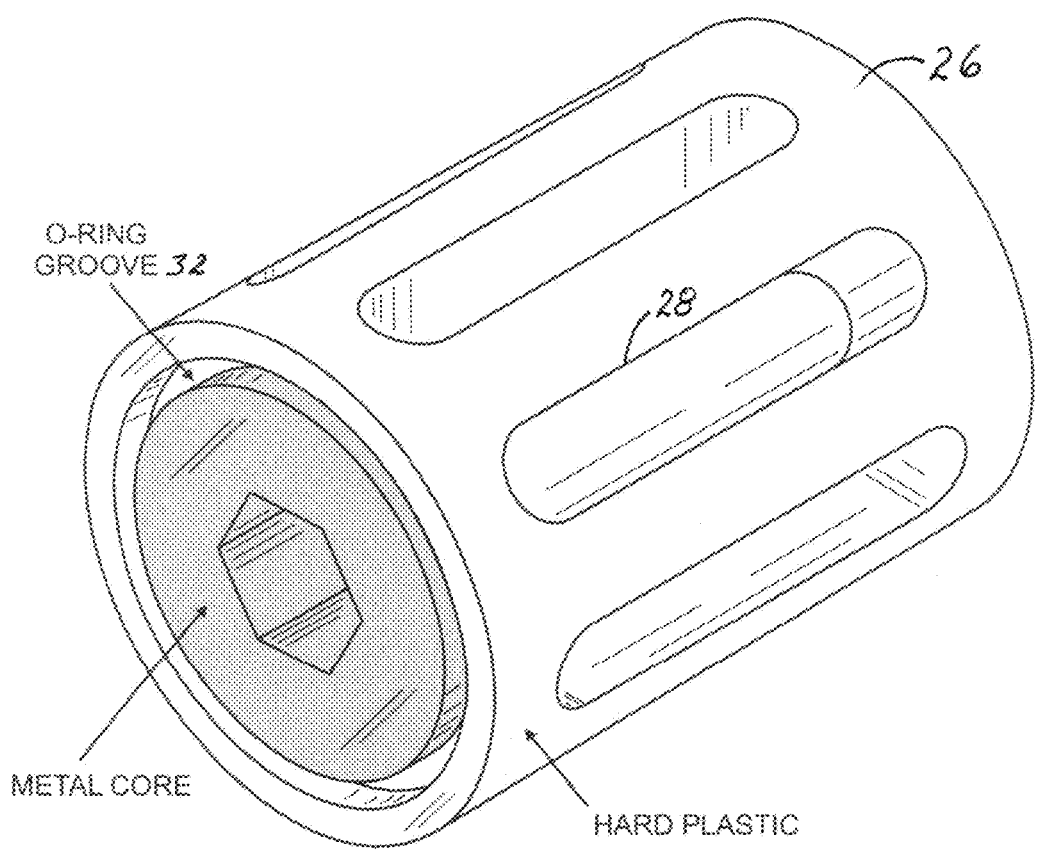
FIG. 9 is an isometric view of a plastic-coated metal core rotor, which is adapted to fit into the housing of FIG. 3.

The rotor of FIG. 9 is a metal core with a hard plastic coating. The core is preferably made of stainless steel or aluminum.

The O-ring of FIGS. 10 and 11 are compression O-rings, not sealing rings. They are preferably made from fluoroelastomers or FKMs, such as Viton.

Figures 12, 13:
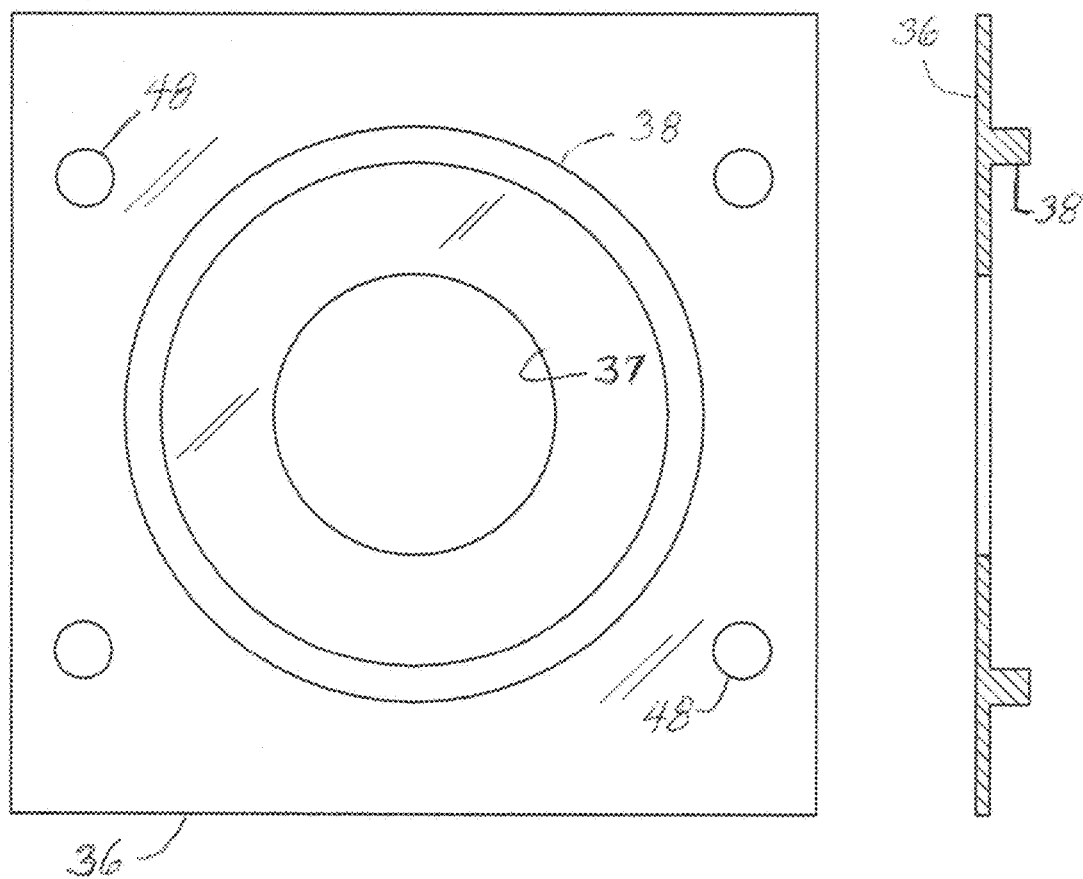
FIG. 12 is a rotor-side view of a motor end compression plate.
FIG. 13 is a vertical cross sectional view of the motor end compression plate of FIG. 12.

FIGS. 12 and 13 show the motor end compression plate 36, which has an upstanding ring 38 on the face side of the compression plate. The surface of the ring engages the surface of the compression O-ring, the amount of interference determined by the amount of compression force applied to the O-ring.

Figure 14:
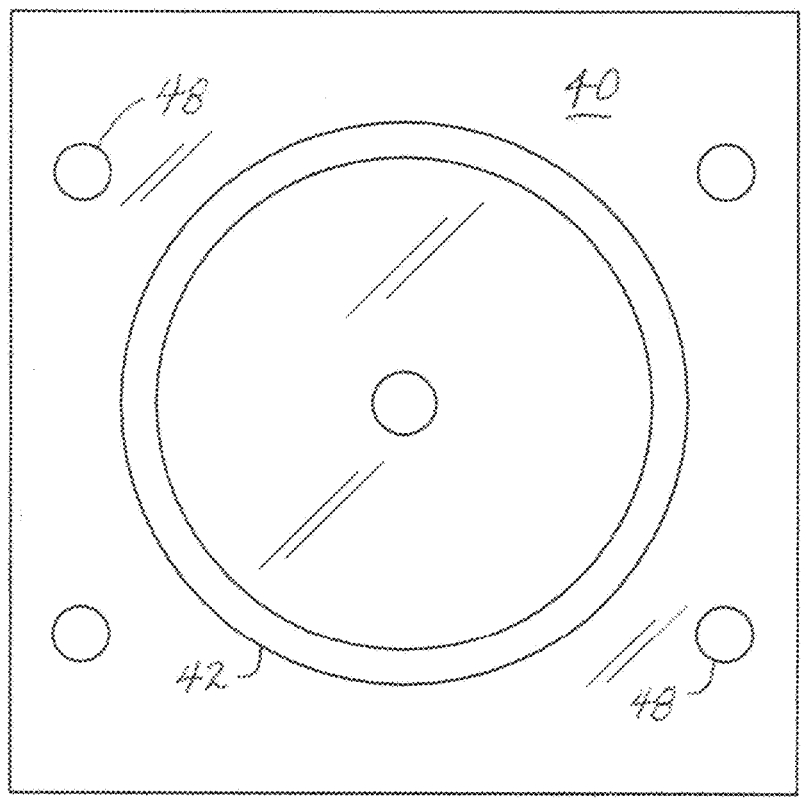
FIG. 14 is a rotor-side view of an. opposing compression plate to that of FIG. 12.
Figure 15:
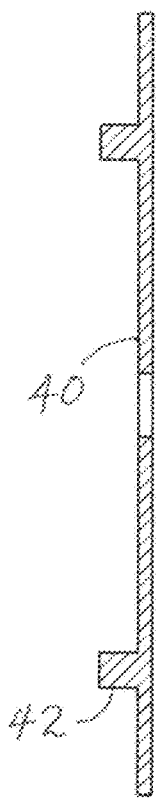
FIG. 15 is a vertical cross sectional view of the compression plate of FIG. 14.
Figure 20:
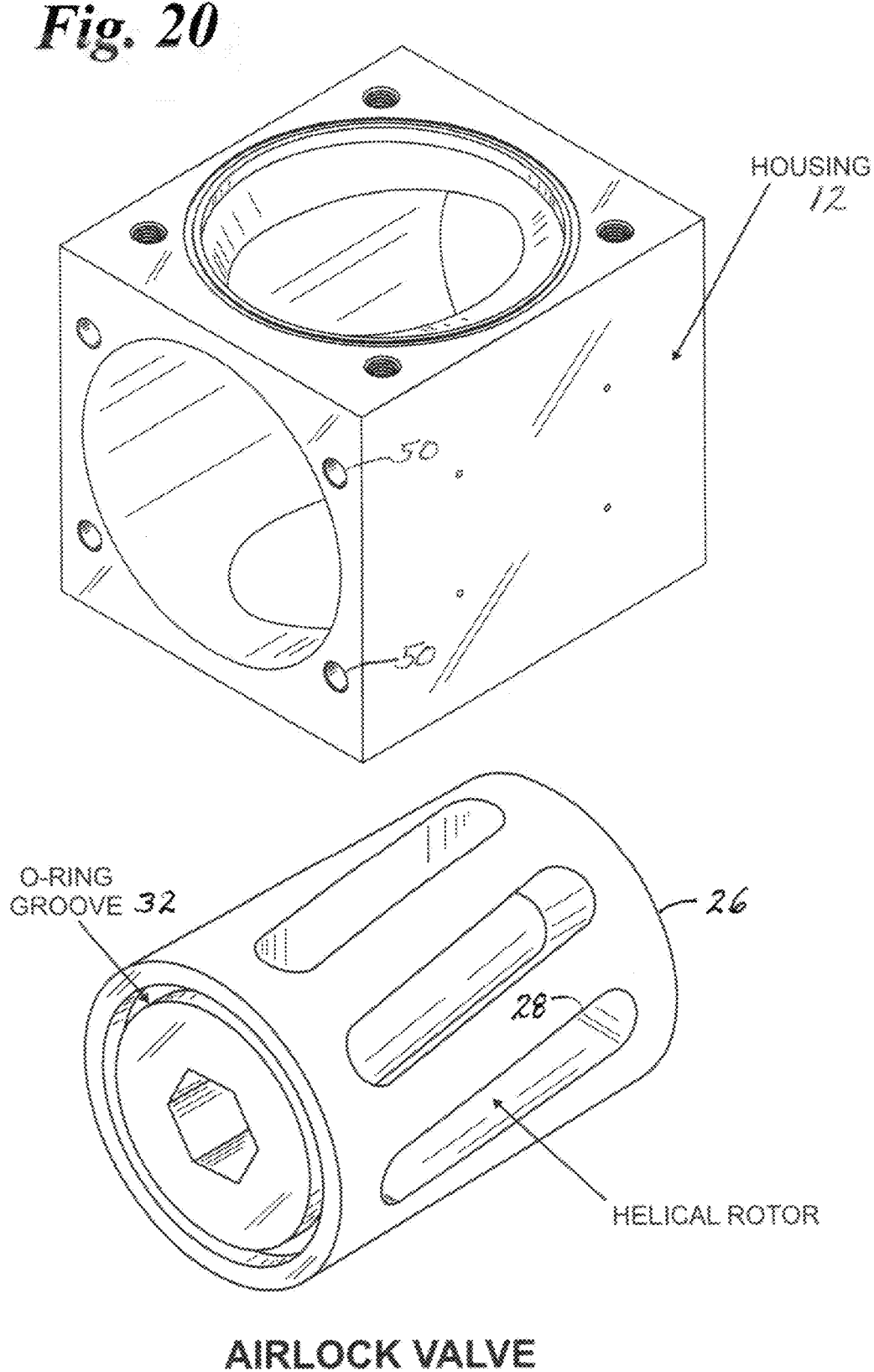
FIG. 20 is an isometric view of the housing for the airlock and flow control rotors.
Figure 21:
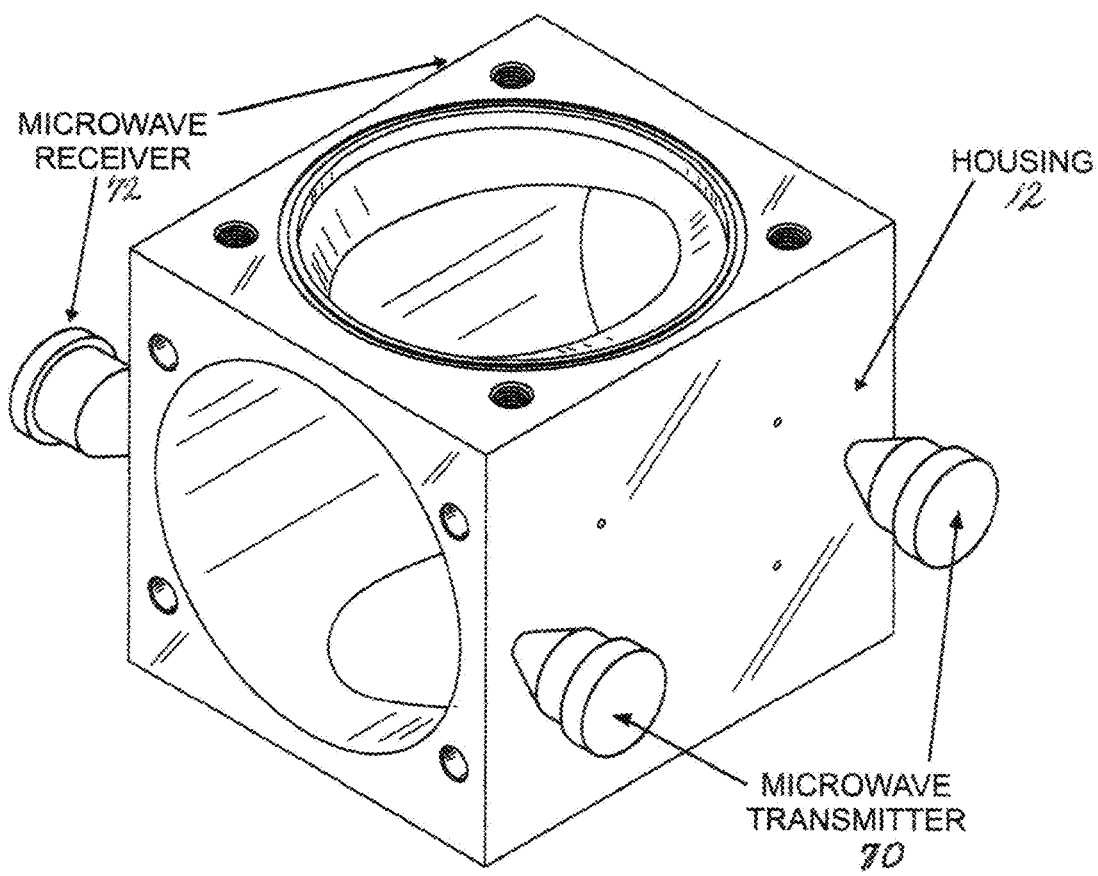
FIG. 21 is an isometric view of an airlock mass measurement valve with microwave transmitters and receivers.

The opposing or plain end compression plate 40, which is opposite the motor end. is shown in FIGS. 14 and 15 Adjustment of the compression plate is made only on the motor end of the rotor, which establishes the force of the rotor against the inside of the housing.

The motor end housing end cap of FIGS. 16 and 17 is installed on the housing to lock the compression plate into position. The holes through the end cap match those in the plain end housing end cap of FIGS. 18 and 19. Fixing of the plain end housing end cap and the motor end cap by the shoulder bolts 44 lock the rotor into compression. The compression is balanced, unless there is a change of length in the compression O-ring. To increase or decrease the sealing force, the user changes the length of the compression ring. When they are the same length, the rotor is balanced.

Mass Measurement Feeding

The density of the material being handled is measured by the Mass Measurement Airlock Feeder. Density can be defined as the closeness of mass in a unit of a substance. The Mass Measurement Airlock Feeder operates on the principle of differential attenuation. In so doing, microwaves are transmitted from transmitter 70 into the Rotor Pocket filled with material into receiver 72 and compared to microwaves transmitted into Rotor Pockets emptied of material; the difference is read as attenuation. Attenuation is the amount of Microwave energy absorbed by the material within the filled pocket.

Based on this concept, as the attenuation readings increase, the Airlock Feeder slows down, as the attenuation readings decrease, the Airlock Feeder speeds up. To say it in a direct way, as density increases, the Airlock Feeder slows down, as the density decreases, the Airlock Feeder speeds up. The Airlock Feeder tracks a base line set point, determined from true density readings, taken in real time from within the Airlock Feeder.

It is critical where the density readings are taken. In the case of the Mass Measurement Airlock Feeder, they are taken from material trapped within a Sealed Rotor Pocket. Once the material is trapped within the air tight Pocket, it is isolated from further air changes and from further mechanical changes. Density readings are taken as the Sealed Pocket rotates past a Microwave Transmitter. As the Rotor continues to turn, the density read material discharges directly into the downstream process. Thereby, the Mass Measurement Airlock Feeder makes possible continuous, non-stop highly accurate Mass Measurement Feeding.

Mass Measurement Feeding depends upon the material's own composition for measurement. This is derived from what are called dielectric constants. All materials have a dielectric constant. A dielectric is a non-conducting substance within a material. Generally speaking, the higher the dielectric constant of a material, the higher the attenuation—hence the lower the dielectric, the lower the attenuation. That is, the higher the dielectric, the more microwaves that are absorbed passing through the material due to the higher non-conducting value of the material. The lower the dielectric, the lower the loss of transmitted microwaves.

To give an example: terephthalic acid (a powder) has a published dielectric constant of 1.5. Bench tests have shown that this material has an attenuation of about 28%. Gypsum powder has a published dielectric constant of 6.0, and bench tests show that this material attenuates at about 68%. It can be seen then that a material's own properties bear directly on the amount of electromagnetic energy absorbed (microwaves).

It can be seen that the dielectric constant and the density of a material are related in energy absorption. For example: if an empty feeder pocket reads 600 mVs (millivolts and a filled pocket reads 400 mVs, then the attenuation is 200 mVs (600−400=200). It is the 200 mV value that is commuted into pounds per revolution, or some other value that is meaningful to the end user's process. It is the difference between an empty pocket and a filled pocket, as related to pocket volume that equals mass measurement. Computed in solid state, the instrumentation is box enclosed and mounted in the control room.

As the density of the material changes, attenuation changes with it. From this, it can be seen that the airlock feeder is measuring the density of the material in real time. The microwave frequency used in this mass measurement feeder is not harmful to either humans or to the material.

SUMMARY OF THE ACHIEVEMENT OF THE OBJECTS OF THE INVENTION

From the foregoing, it is readily apparent that I have invented an improved rotary airlock rotor and rotor housing which will provide zero static leakage, which is easily centered and balanced, and which has hard plastic rotors or plastic coated metal rotors, which has no metal-to metal contact, and which is operable over a large range of temperatures.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is defined by the appended claims.

What is claimed is:

1. A rotary airlock valve comprising:
   a housing having an inlet opening and an outlet opening, and an internal horizontal taper for receiving a rotor;
   a rotor rotatably disposed within said housing and being externally tapered to mate with said internal taper of said housing;
   a circular groove in each end of said rotor;
   a compression O-ring situated in each of said circular grooves;
   a pair of compression plates, each having a circular projection adapted to contact said compression O-ring in one of said circular grooves;
   a pair of end plates, each end plate being fixed to said housing by shoulder bolts situated in and extending through said end plate and one of said compression plates, said shoulder bolts exerting compressive force on said compression plates and said O-rings to balance said rotor within said housing.

2. The rotary airlock valve according to claim 1, wherein said rotor is constructed of hard plastic.

3. The rotary airlock valve according to claim 2, wherein said rotor is made of material selected from the group consisting of DELRIN® acetal homopolymers, polyether ether ketone (PEEK), polyimide, or ultra high molecular weight polyethylene (UHMW-PE).

4. The rotary airlock valve according to claim 1, wherein said rotor is constructed of metal covered by ceramic material, or high temperature silicone resin.

5. The rotary airlock valve according to claim 1, wherein said rotor is constructed of metal covered by hard plastic material selected from the group consisting of DELRIN® acetal homopolymers, polyether ether ketone (PEEK), polyimide, or ultra high molecular weight polyethylene (UHMW-PE).

6. The rotary airlock valve according to claim 1, wherein said rotor is provided with one or more pockets.

7. The rotary airlock valve according to claim 1 wherein said housing internal taper is from about 1 to about 10 degrees.

8. The rotary airlock valve according to claim 1 wherein said compression O-rings are made from fluoroelastomers or FKMs.

9. A mass measurement feeder, comprising:
   a rotary airlock valve, comprising:
      a housing having an inlet opening and an outlet opening, and an internal horizontal taper for receiving a rotor;
      a rotor rotatably disposed within said housing and being externally tapered to mate with said internal taper of said housing;
      a circular groove in each end of said rotor;
      a compression O-ring situated in each of said circular grooves;
      a pair of compression plates, each having a circular projection adapted to contact said compression O-ring in one of said circular grooves;
      end plates fixed to said housing by shoulder bolts situated in and extending through said end plates and said compression plates, said shoulder bolts exerting compressive force on said compression plates and said O-rings to balance said rotor within said housing;
   and further comprising:
      at least two pockets in said rotor;
      a microwave transmitter directed to a pocket to be filled;
      a microwave transmitter directed to an empty pocket;
      a microwave receiver, and a comparitor to measure the density of the material in real time, and thus the amount of material passing through the feeder.

10. The mass measurement feeder according to claim 9, wherein said rotor is constructed of hard plastic.

11. The mass measurement feeder according to claim 10, wherein said rotor is made of material selected from the group consisting of DELRIN® acetal homopolymers, polyether ether ketone (PEEK), polyimide, or ultra high molecular weight polyethylene (UHMW-PE).

12. The mass measurement feeder according to claim 9, wherein said rotor is constructed of metal covered by ceramic material, or high temperature silicone resin.

13. The mass measurement feeder according to claim 9, wherein said rotor is constructed of metal covered by hard plastic material selected from the group consisting of DELRIN® acetal homopolymers polyether ether ketone (PEEK), polyimide, or ultra high molecular weight polyethylene (UHMW-PE).

14. The mass measurement feeder according to claim 9 wherein said compression O-rings are made from fluoroelastomers or FKMs.

15. A rotary flow control valve comprising:
   a housing having an inlet opening and an outlet opening, and an internal horizontal taper for receiving a rotor;
   a rotor having an axis of rotation and being provided with a opening through said rotor normal to said axis, said rotor being rotatably disposed within said housing and being externally tapered to mate with said internal taper of said housing;
   a circular groove in each end of said rotor;
   a compression O-ring situated in each of said circular grooves;
   a pair of compression plates, each having a circular projection adapted to contact said compression O-ring in one of said circular grooves;
   end plates fixed to said housing by shoulder bolts situated in and extending through said end plates and said compression plates, said shoulder bolts exerting compressive force on said compression plates and said O-rings to balance said rotor within said housing; and
   an associated positioner for controlling the axial position of rotation of said rotor.

16. The rotary flow control valve according to claim 15, wherein said rotor is constructed of hard plastic.

17. The rotary flow control valve according to claim 16, wherein said rotor is made of material selected from the group consisting of DELRIN® acetal homopolymers, polyether ether ketone (PEEK), polyimide, or ultra high molecular weight polyethylene (UHMW-PE).

18. The rotary flow control valve according to claim 15, wherein said rotor is constructed of metal covered by ceramic material, or high temperature silicone resin.

19. The rotary flow control valve according to claim 15, wherein said rotor is constructed of metal covered by hard plastic material selected from the group consisting of DELRIN® acetal homopolymers, polyether ether ketone (PEEK), polyimide, or ultra high molecular weight polyethylene (UHMW-PE).

20. The rotary airlock valve according to claim 15 wherein said compression O-rings are made from fluoroelastomers or FKMs.

21. A rotary on-off valve comprising:
   a housing having an inlet opening and an outlet opening, and an internal horizontal taper for receiving a rotor;
   a rotor having an axis of rotation and being provided with a tubular opening through said rotor normal to said axis, said rotor being rotatably disposed within said housing and being externally tapered to mate with said internal taper of said housing;
   a circular groove in each end of said rotor;
   a compression O-ring situated in each of said circular grooves;
   a pair of compression plates, each having a circular projection adapted to contact said compression O-ring in one of said circular grooves;
   end plates fixed to said housing by shoulder bolts situated in and extending through said end plates and said compression plates, said shoulder bolts exerting compressive force on said compression plates and said O-rings to balance said rotor within said housing.

22. The rotary on-off valve according to claim 21, wherein said rotor is constructed of hard plastic.

23. The rotary on-off valve according to claim 22, wherein said rotor is made of material selected from the group consisting of DELRIN® acetal homopolymers polyether ether ketone (PEEK), polyimide, or ultra high molecular weight polyethylene (UHMW-PE).

24. The rotary on-off valve according to claim 21, wherein said rotor is constructed of metal covered by ceramic material, or high temperature silicone resin.

25. The rotary on-off valve according to claim 21, wherein said rotor is constructed of metal covered by hard plastic material selected from the group consisting of DELRIN® acetal homopolymers, polyether ether ketone (PEEK), polyimide, or ultra high molecular weight polyethylene (UHMW-PE).

26. The rotary on-off valve according to claim 21 wherein said compression O-rings are made from fluoroelastomers or FKMs.

* * * * *